US010563920B2

(12) United States Patent
Oliver et al.

(10) Patent No.: US 10,563,920 B2
(45) Date of Patent: Feb. 18, 2020

(54) OVEN-STYLE NOZZLE FOR REWORKING OPERATIONS INVOLVING BOTTOM-SIDE TERMINATED COMPONENTS OR OTHER COMPONENTS

(71) Applicant: Raytheon Company, Waltham, MA (US)

(72) Inventors: Bruce E. Oliver, McKinney, TX (US); Michael E. Kratz, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 543 days.

(21) Appl. No.: 14/563,817

(22) Filed: Dec. 8, 2014

(65) Prior Publication Data

US 2016/0165769 A1 Jun. 9, 2016

(51) Int. Cl.
| | |
|---|---|
| *F27D 99/00* | (2010.01) |
| *F27D 11/12* | (2006.01) |
| *B23K 1/00* | (2006.01) |
| *B23K 1/008* | (2006.01) |
| *B23K 1/012* | (2006.01) |

(52) U.S. Cl.
CPC .............. *F27D 11/12* (2013.01); *B23K 1/008* (2013.01); *B23K 1/0016* (2013.01); *B23K 1/012* (2013.01); *F27D 99/0035* (2013.01)

(58) Field of Classification Search
None
See application file for complete search history.

(56) References Cited

U.S. PATENT DOCUMENTS

| | | | | |
|---|---|---|---|---|
| 4,316,434 A | * | 2/1982 | Bailey | F22B 27/12 122/155.2 |
| 4,564,135 A | * | 1/1986 | Barresi | B23K 1/012 228/180.21 |
| 4,610,388 A | * | 9/1986 | Koltuniak | B23K 1/012 228/20.1 |
| 4,767,047 A | * | 8/1988 | Todd | H05K 13/0486 228/191 |
| 4,805,827 A | * | 2/1989 | Coffman | B23K 3/04 228/20.1 |

(Continued)

OTHER PUBLICATIONS

Zevac—"Onyx 32 Multifunctional Positioning and Soldering System"; printed Dec. 8, 2014; 6 pages.

(Continued)

*Primary Examiner* — Steven B McAllister
*Assistant Examiner* — Benjamin W Johnson

(57) ABSTRACT

An apparatus includes a gas interface configured to be fluidly coupled to a gas source and to receive a heated gas flow from the gas source. The apparatus also includes a convection-to-radiant heat transfer section configured to receive convection heat from the heated gas flow. The apparatus further includes a compartment configured to receive a component. The heat transfer section is configured to convert the convection heat into radiant heat and to provide the radiant heat to the compartment in order to heat the component within the compartment. The apparatus is configured to substantially block the heated gas flow from contacting the component within the compartment. One or more exhaust vent openings may be configured to allow exhaust of the heated gas flow from the apparatus. A damper may be configured to selectively release or block the one or more exhaust vent openings.

20 Claims, 10 Drawing Sheets

(56) References Cited

U.S. PATENT DOCUMENTS

| | | | | |
|---|---|---|---|---|
| 5,193,735 A | * | 3/1993 | Knight | F27B 9/3077 |
| | | | | 219/388 |
| 5,196,667 A | * | 3/1993 | Gammelin | B23K 1/012 |
| | | | | 219/85.12 |
| 5,271,545 A | * | 12/1993 | Boswell | B23K 1/008 |
| | | | | 228/183 |
| 5,309,545 A | | 5/1994 | Spigarelli et al. | |
| 5,320,273 A | * | 6/1994 | Goenka | B23K 3/085 |
| | | | | 222/603 |
| 5,328,084 A | * | 7/1994 | Halstead | B23K 1/008 |
| | | | | 228/18 |
| 5,419,481 A | * | 5/1995 | Lasto | B23K 1/012 |
| | | | | 228/191 |
| 5,560,531 A | | 10/1996 | Ruszowski | |
| 6,474,530 B1 | | 11/2002 | Hodil, Jr. et al. | |
| 6,897,410 B1 | * | 5/2005 | Ho | H05K 13/0486 |
| | | | | 219/385 |
| 2003/0170444 A1 | * | 9/2003 | Stewart | H01L 21/563 |
| | | | | 428/317.7 |
| 2003/0170450 A1 | * | 9/2003 | Stewart | H05K 3/305 |
| | | | | 428/343 |
| 2013/0001272 A1 | * | 1/2013 | Kurihara | B23K 3/04 |
| | | | | 228/9 |

OTHER PUBLICATIONS

Air-Vac "Nozzle Data Sheet for: Chip Scale Packages & Flip Chip (6mm & smaller)"; CSPFC NMX Jul. 1, 2004; 1 page.

* cited by examiner

OVEN-STYLE NOZZLE FOR REWORKING OPERATIONS INVOLVING BOTTOM-SIDE TERMINATED COMPONENTS OR OTHER COMPONENTS

TECHNICAL FIELD

This disclosure is generally directed to reworking systems. More specifically, this disclosure is directed to an oven-style nozzle for reworking operations involving bottom-side terminated components or other components.

BACKGROUND

A bottom-side terminated component can be attached to a circuit board or other structure using a reflow soldering technique. In a reflow soldering technique, heat is applied to melt solder on the bottom-side terminated component, and the melted solder forms electrical connections between the bottom-side terminated component and the circuit board or other structure. In some reflow soldering approaches, hot gas is blown on top of the bottom-side terminated component to heat the component's body. The heat passes through the component's body down to the solder, which melts to form the electrical connections.

SUMMARY

This disclosure provides oven-style nozzle for reworking operations involving bottom-side terminated components or other components.

In a first embodiment, an apparatus includes a gas interface configured to be fluidly coupled to a gas source and to receive a heated gas flow from the gas source. The apparatus also includes a convection-to-radiant heat transfer section configured to receive convection heat from the heated gas flow. The apparatus further includes a compartment configured to receive a component. The heat transfer section is configured to convert the convection heat into radiant heat and to provide the radiant heat to the compartment in order to heat the component within the compartment. The apparatus is configured to substantially block the heated gas flow from contacting the component within the compartment.

In a second embodiment, a system includes a gas source configured to generate a heated gas flow. The system also includes a reworking nozzle having a gas interface configured to be fluidly coupled to the gas source and to receive the heated gas flow from the gas source. The reworking nozzle also includes a convection-to-radiant heat transfer section configured to receive convection heat from the heated gas flow. The reworking nozzle further includes a compartment configured to receive a component. The heat transfer section is configured to convert the convection heat into radiant heat and to provide the radiant heat to the compartment in order to heat the component within the compartment. The reworking nozzle is configured to substantially block the heated gas flow from contacting the component within the compartment.

In a third embodiment, a method includes receiving a component in a compartment of a reworking nozzle and receiving a heated gas flow at the reworking nozzle. The method also includes receiving convection heat from the heated gas flow at a convection-to-radiant heat transfer section of the reworking nozzle. The method further includes providing radiant heat to the compartment of the reworking nozzle using the convection-to-radiant heat transfer section of the reworking nozzle in order to heat the component within the compartment. In addition, the method includes substantially blocking the heated gas flow from contacting the component within the compartment.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, in some conventional reworking approaches, hot gas is blown on top of a bottom-side terminated component to melt solder located on bottom of the component. This approach works well when the components are large and the positions of the components are not affected by turbulence caused by the hot gas flows. However, components are constantly becoming smaller in size and lighter in weight. As a result, turbulence caused by a hot gas flow during a conventional reworking process can cause a component to move and become misaligned with a circuit board or other structure. When this occurs, the solder melts in the wrong locations, and one or more desired electrical connections may not form due to this misalignment. In extreme circumstances, turbulence from a hot gas flow could actually blow a component completely off a circuit board or other structure. Moreover, when solder in a solid form turns liquid, compression caused by the hot gas down onto the bottom-side terminated component can lead to solder joint bridges, which are not permitted (defective).

In accordance with this disclosure, various reworking nozzles are provided that use hot gas flows to heat radiant oven-style enclosures. The oven-style enclosures help to substantially block turbulent gas flows from contacting components being attached during reworking operations, which helps to prevent the gas flows from causing misalignment of the components. Moreover, some embodiments of the reworking nozzles allow exhausted gas flows to be selectively directed either towards or away from circuit boards or other structures (outside of the oven-style enclosures). If directed towards the circuit boards or other structures, the exhausted gas flows could be used to help heat at least part of the circuit boards or other structures to facilitate faster or easier reflow operations.

Figure 1:
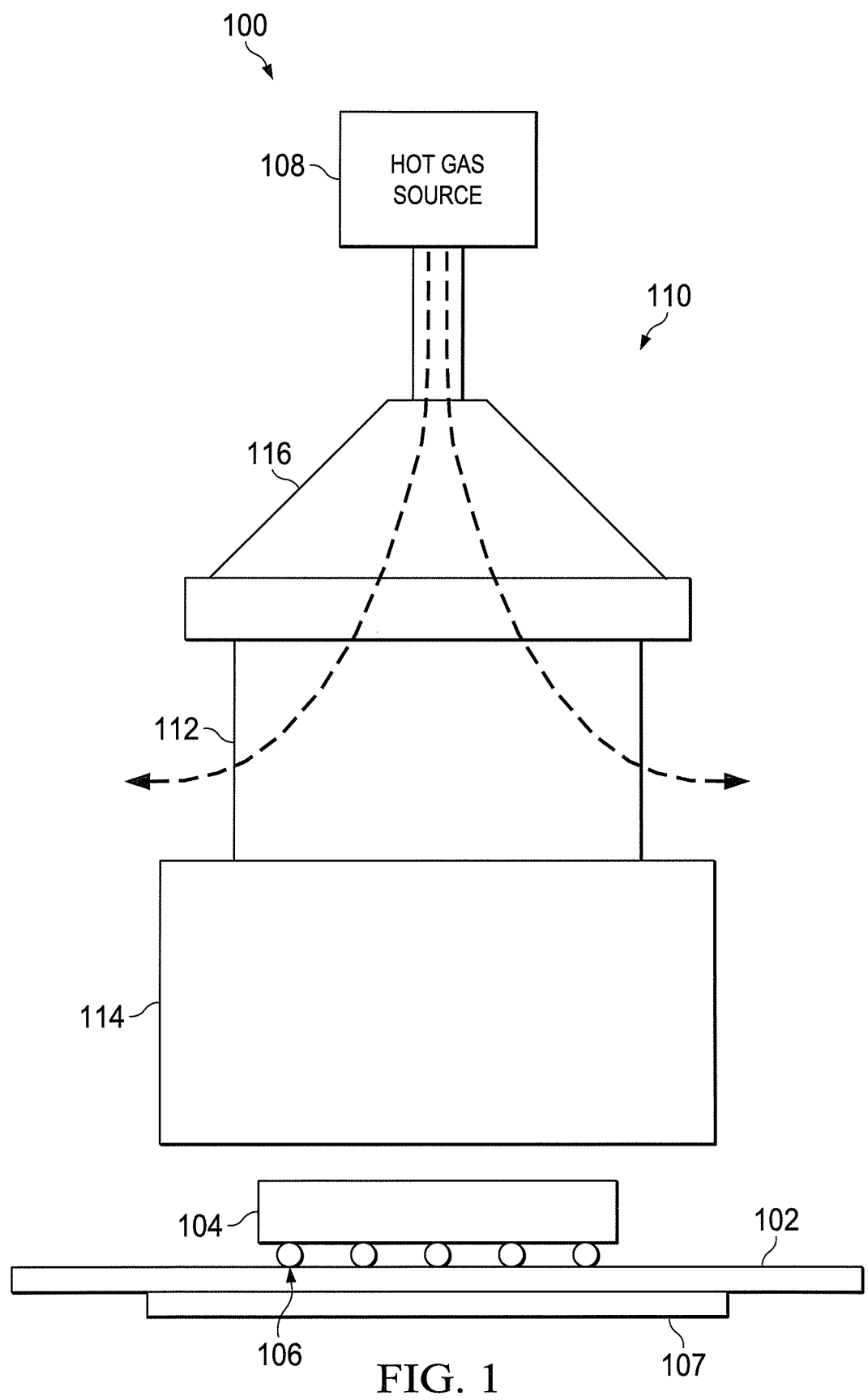
FIG. 1 illustrates an example reworking system according to this disclosure.

FIG. 1 illustrates an example reworking system 100 according to this disclosure. In this example, the reworking system 100 is shown as being used in conjunction with a circuit board 102 on which a bottom-side terminated component 104 is to be mounted. Solder 106 is attached to the bottom of the component 104. After proper alignment of the component 104, the reworking system 100 heats the component 104 (and optionally part of the surrounding circuit board 102) to melt the solder 106 and form electrical connections between the component 104 and the circuit board 102. The component 104 could represent any suitable component being subjected to a reworking operation, such as a bottom-side terminated integrated circuit chip or other component with a micro-ball grid array (μBGA) or a flip-chip design. However, the reworking system 100 could be used in other reworking operations and is not limited to use with bottom-side terminated components 104 or circuit boards 102.

As shown in FIG. 1, the reworking system 100 includes a bottom-side circuit board heat source 107, a hot gas source 108, and a reworking nozzle 110. The heat source 107 denotes a structure that can be used to heat at least a portion of the circuit board 102. The heating by the heat source 107 is in addition to the heating by the hot gas source 108 and the reworking nozzle 110 described below. The heat source 107 represents any suitable structure for providing heat to a circuit board or other structure to support reworking operations.

The hot gas source 108 generally denotes any suitable structure for generating a flow of hot gas, where the hot gas is used during reworking operations. Various hot gas sources are known and available in the reworking industry and can provide various temperatures, gas flow rates, or other characteristics of hot gas. In some embodiments, the temperature and/or gas flow rate of the hot gas source 108 could be adjusted based on the component being reworked and the type of solder being used. As a particular example, the gas flow rate could be adjusted to provide the desired amount of heat to the reworking nozzle 110.

The reworking nozzle 110 generally denotes a structure that receives a hot gas flow from the hot gas source 108 and that heats at least one component 104. The reworking nozzle 110 includes a heat transfer section 112 and an oven-style compartment 114. The heat transfer section 112 includes an absorption/radiant heat plate or other structure that absorbs convection heat from the hot gas flow and provides heat into the oven-style compartment 114. The plate or other structure also substantially blocks the hot gas flow from entering the oven-style compartment 114 via the heat transfer section 112. Due to the heat transfer, the oven-style compartment 114 heats the component 104 within the oven-style compartment 114 via radiative heating, causing the solder 106 to melt.

The reworking nozzle 110 also includes a hot gas interface 116, which denotes the portion of the reworking nozzle 110 that fluidly couples to the hot gas source 108 (either directly or indirectly via a tube or other structure). The hot gas interface 116 allows received gas to pass through the interface 116 to the heat transfer section 112. The hot gas interface 116 could have any suitable size, shape, and dimensions. In some embodiments, the hot gas interface 116 supports a standard or other connector that can be coupled to a number of hot gas sources 108. In other embodiments, the hot gas interface 116 can be designed to couple to a specific hot gas source 108.

The reworking nozzle 110 includes any suitable structure for receiving a flow of hot gas and heating an oven-style compartment with the hot gas, where the oven-style compartment is configured to heat one or more components via radiant heating. Example implementations of the reworking nozzle 110 are shown in FIGS. 2A through 4D, which are described below. In particular embodiments, the reworking nozzle 110 could be used as part of the ONYX 32 multi-functional positioning and soldering system or other robotic soldering system. In other particular embodiments, the reworking nozzle 110 could be used as part of a handheld device.

Because the flow of hot gas is substantially blocked from entering the oven-style compartment 114 from the heat transfer section 112, turbulence caused by the flow of hot gas is substantially or completely eliminated inside the oven-style compartment 114. As a result, it is much easier to maintain alignment of the component 104 on the circuit board 102. Also, the flow of hot gas cannot blow the component 104 off the circuit board 102. This can be a significant benefit in various scenarios, such as when components subjected to reworking operations are very small or light. Moreover, the flow of hot gas does not compress the component 104 or cause the solder 106 to be compressed. Further, since the oven-style compartment 114 is relatively small and the hot gas source 108 can provide heated gas at a high flow rate, the oven-style compartment 114 can be heated very rapidly, and components within the oven-style compartment 114 can be heated substantially evenly. In addition, an output end of the reworking nozzle 110 can be adjustable to accommodate a wide variety of components with varying sizes and arrangements.

Although FIG. 1 illustrates one example of a reworking system 100, various changes may be made to FIG. 1. For example, the reworking system 100 could include any number of hot gas sources 108 and reworking nozzles 110 in any suitable arrangement. Also, the reworking system 100 could be used to support any reworking operations involving any components.

Figure 2A:
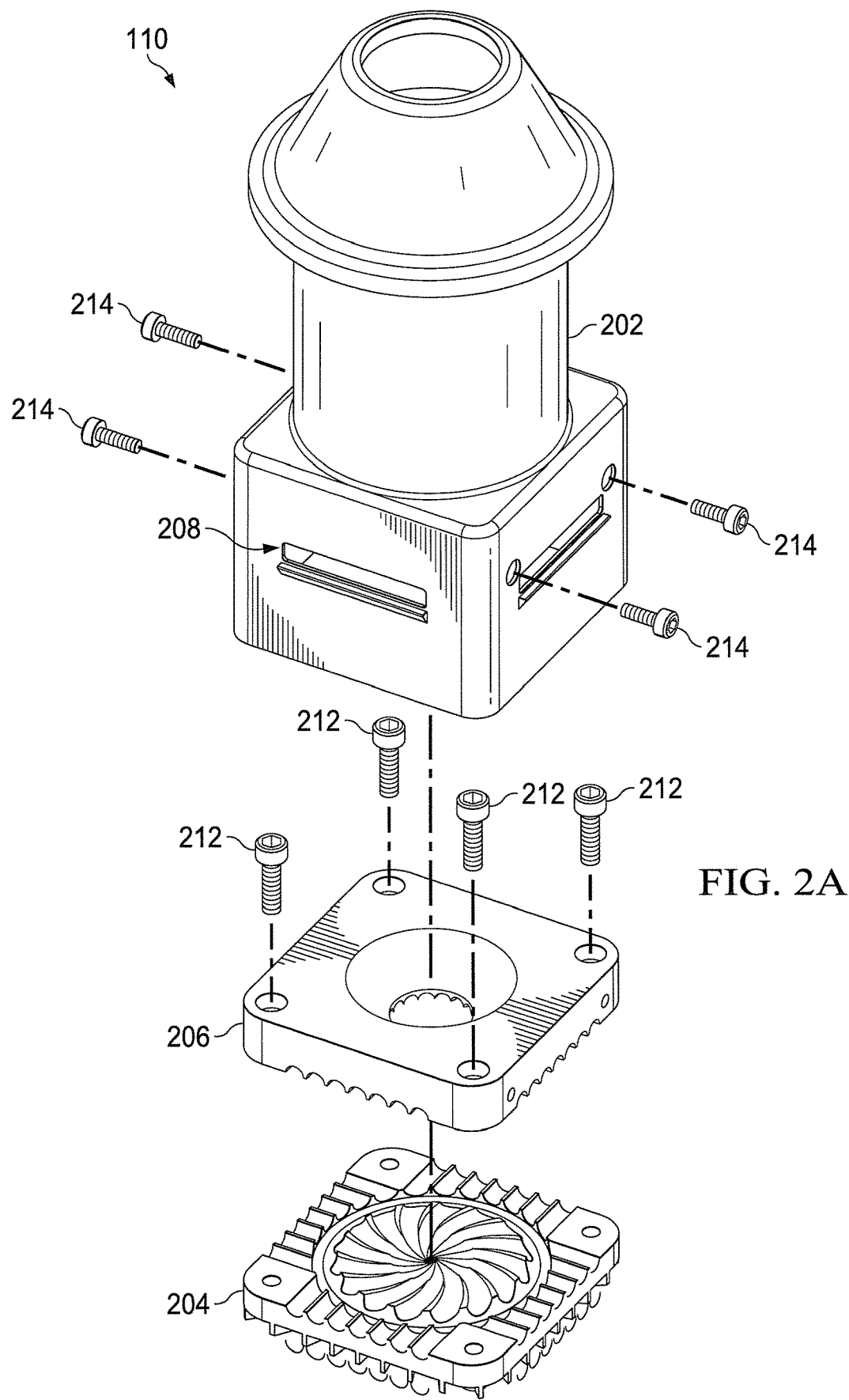
FIGS. 2A through 2D illustrate a first example oven-style reworking nozzle according to this disclosure.
Figure 2B:
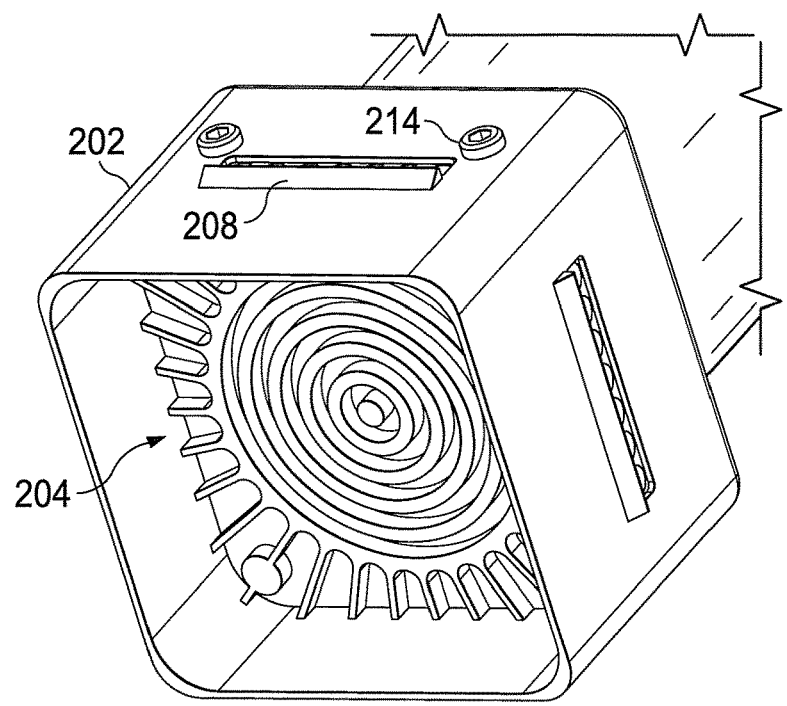

FIGS. 2A through 2D illustrate a first example oven-style reworking nozzle 110 according to this disclosure. As shown in FIGS. 2A and 2B, the reworking nozzle 110 includes a housing 202, which defines the overall shape of the reworking nozzle 110. The heat transfer section 112, oven-style compartment 114, and hot gas interface 116 are defined (at least in part) by the size, shape, and dimensions of the housing 202. The housing 202 can be formed from any suitable material(s), such as from one or more metals. The housing 202 can also be formed in any suitable manner, such as by molding.

The reworking nozzle 110 also includes a radiant plate 204, which provides radiant heat from the heat transfer section 112 to the oven-style compartment 114. More specifically, a hot gas flow passes over the radiant plate 204, transferring convection heat from the gas flow to the radiant plate 204. The radiant plate 204 then radiates heat into the oven-style compartment 114. The radiant plate 204 can be formed from any suitable material(s), such as from one or more metals like copper. The radiant plate 204 can also be formed in any suitable manner, such as by etching a metallic blank. In addition, the radiant plate 204 could have any suitable size, shape, and dimensions.

As shown here, the radiant plate 204 includes a number of raised and lowered surfaces on each side of the radiant plate 204. On one side, these raised and lowered surfaces provide a larger surface area for a hot gas flow to contact the radiant plate 204 and transfer heat into the radiant plate 204. On the other side, these raised and lowered surfaces provide a larger surface area for heat transfer into the oven-style compartment 114. In this particular example, the top of the radiant plate 204 includes curved fins and horizontal and vertical fins, and the bottom of the radiant plate 204 includes central circular fins and radial fins. However, each surface of the radiant plate 204 could have any suitable pattern(s) of raised and lowered areas, and the two sides of the radiant plate 204 may or may not have the same pattern(s). Also, one or both sides of the radiant plate 204 may lack any patterns of raised and lowered areas.

Figure 2C:
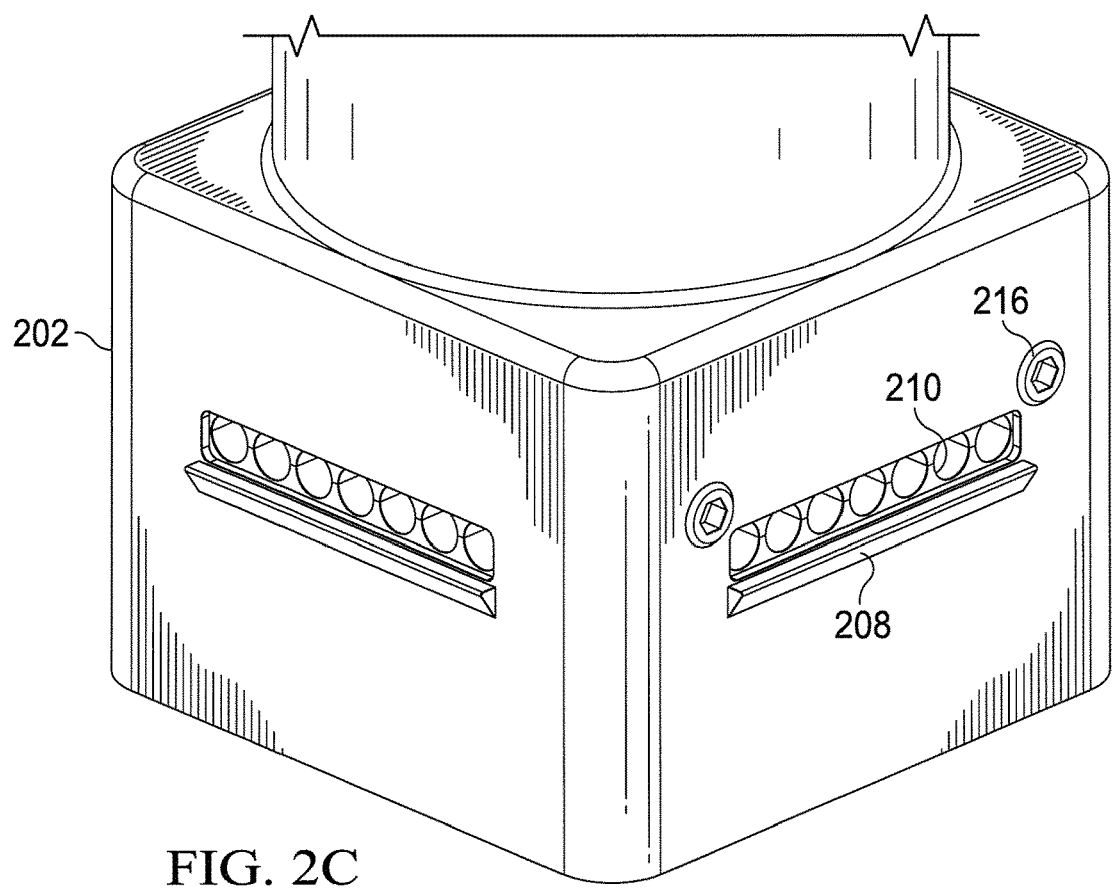
Figure 2D:
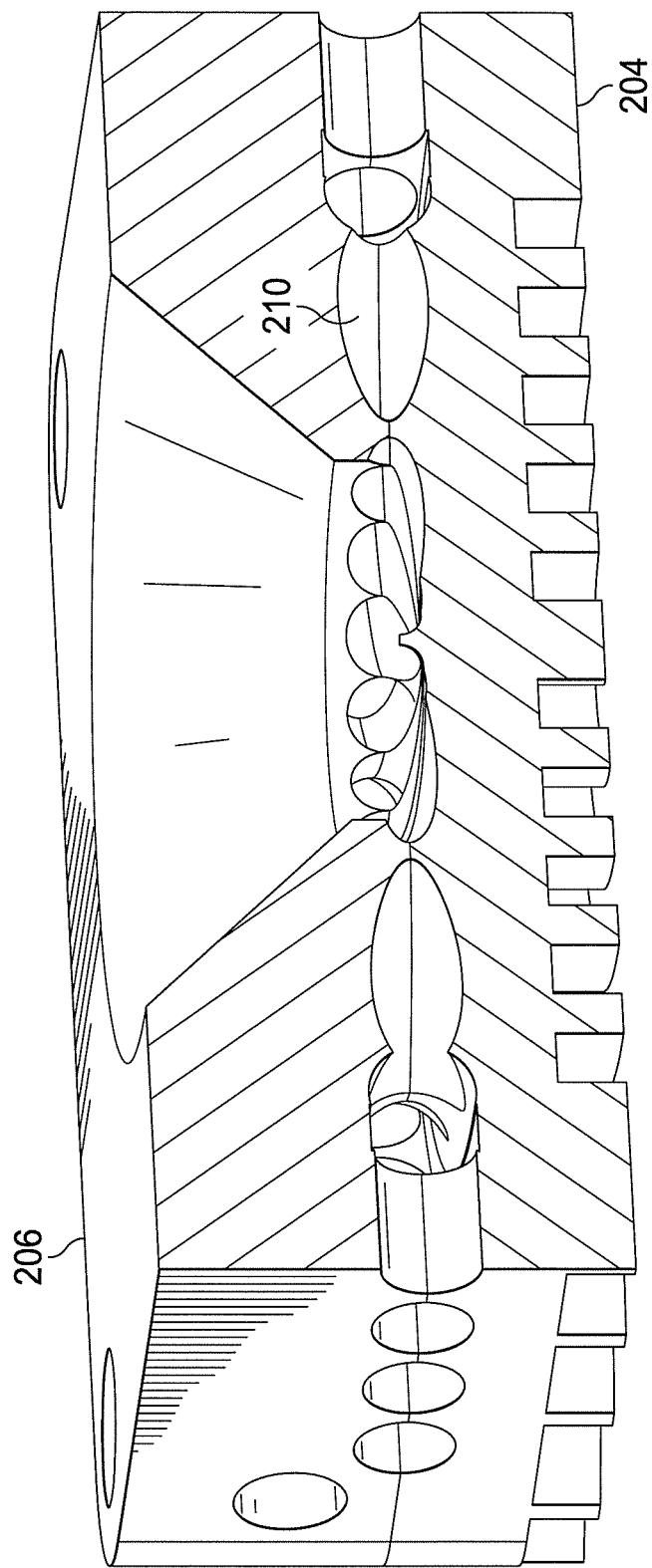

A funnel plate 206 directs a hot gas flow entering the reworking nozzle 110 to a central portion of the radiant plate 204. As shown in FIGS. 2A through 2C, the reworking nozzle 110 further includes one or more vents 208 located within the heat transfer section 112 above the radiant plate 204. The funnel plate 206 forces hot gas to pass through various flow channels within the radiant plate 204 or between the radiant plate 204 and the funnel plate 206, transferring heat to the radiant plate 204, before exiting the reworking nozzle 110 through the vents 208. As shown in FIG. 2D, the bottom of the funnel plate 206 could be patterned to match the pattern on the top of the radiant plate 204, thereby forming flow channels 210 for hot gas to flow through the assembly. The funnel plate 206 includes any suitable structure for focusing a gas flow. The funnel plate 206 can be formed from any suitable material(s) and in any suitable manner. In some embodiments, the funnel plate 206 can be formed from one or more metals, such as copper. In addition, the funnel plate 206 could have any suitable size, shape, and dimensions.

Various connectors 212 couple the radiant plate 204 to the funnel plate 206, and various connectors 214 couple the funnel plate 206 to the housing 202. The connectors 212-214 represent any suitable connecting mechanisms, such as screws or bolts. The connectors 214 can be inserted through openings 216 in the housing 202 in order to be secured to the funnel plate 206.

The vents 208 represent openings in the housing 202 that at least partially expose the flow channels 210. Hot gas passes through the flow channels 210 to transfer convection heat to the radiant plate 204 before exiting the reworking nozzle 110 via the vents 208. In this example, the vents are directional and vent gas upward away from the circuit board 102. This is for illustration only, and the vents 208 can direct the gas in any other suitable direction(s). In some embodiments, each vent 208 could be adjustable to alter the direction that gas exits the vent 208. Also, in this example, each vent 208 denotes an elongated rectangular opening in the housing 202. However, the form of the vents 208 is for illustration only. Any number of vents having any suitable form(s) in any suitable location(s) could be used.

Figure 3:
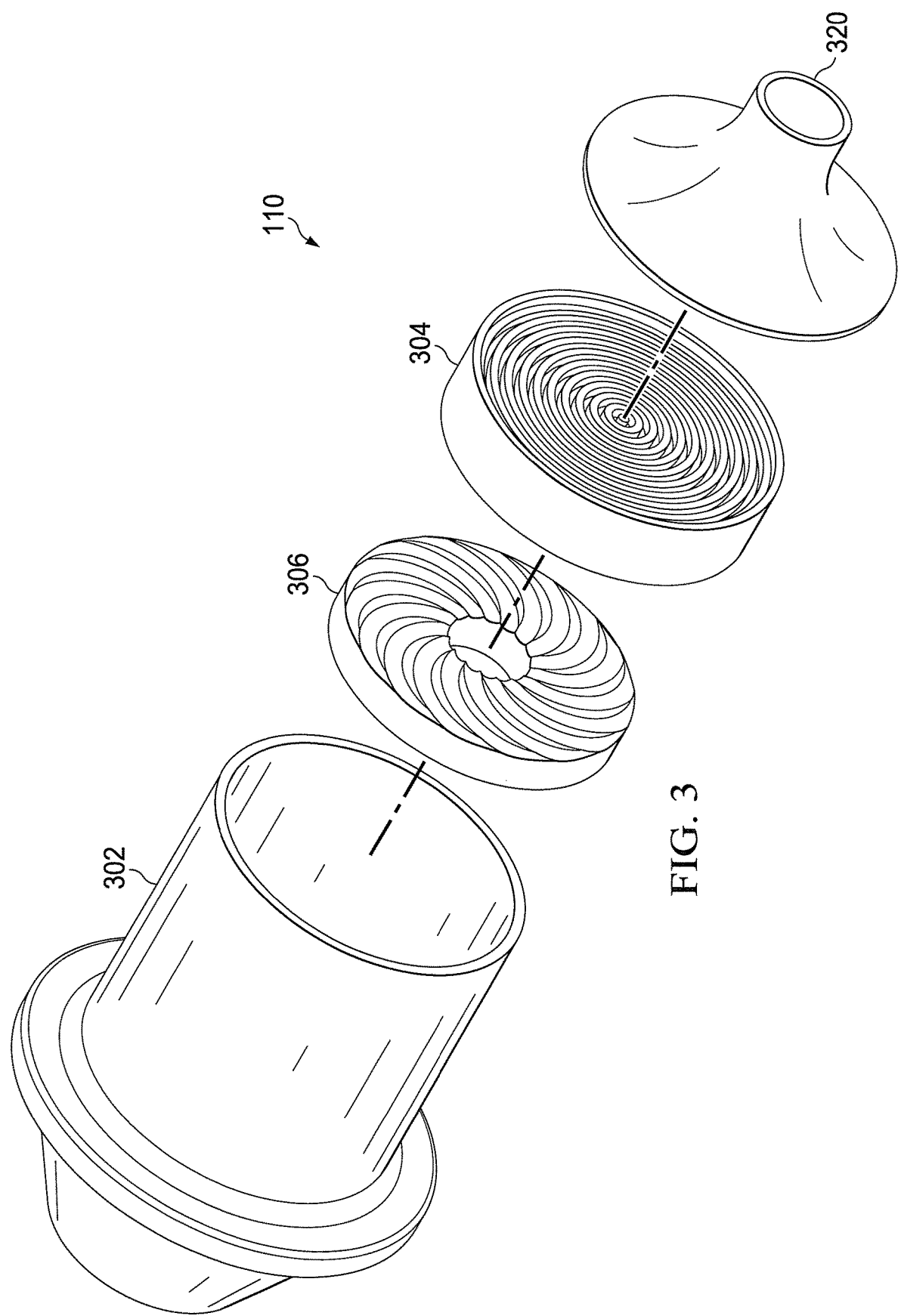
FIG. 3 illustrates a second example oven-style reworking nozzle according to this disclosure.

FIG. 3 illustrates a second example oven-style reworking nozzle 110 according to this disclosure. As shown in FIG. 3, the reworking nozzle 110 here includes an upper housing 302, a radiant plate 304, and a funnel plate 306. These components 302-306 may be the same as or similar to the corresponding components 202-206 described above. Note, however, that the patterns on the radiant plate 304 and the funnel plate 306 are different, indicating that a wide variety of patterns could be used to form flow channels for hot gas. Also note that the housing 302 has been shortened compared to the housing 202 to substantially remove the portion of the housing 202 that formed the oven-style compartment 114. Instead, a tip adapter 320 is used here to form the oven-style compartment 114. The tip adapter 320 could be secured to the housing 302 in any suitable manner, such as by using bolts, screws, threaded sections, friction, or other connecting mechanism(s).

The tip adapter 320 narrows the size of the oven-style compartment 114 at the end of the reworking nozzle 110 compared to the size of the heat transfer section 112. As a result, heat from the reworking nozzle 110 can be directed to a smaller area defined at the end of the tip adapter 320. In some embodiments, the tip adapter 320 can be replaced with other tip adapters 320 to change the size, shape, or other characteristic(s) of the oven-style compartment 114. Each tip adapter 320 could be formed from any suitable material(s) and in any suitable manner.

Different tip adapters 320 could be selected for use based on various factors. For example, different components could have different sizes, shapes, or layouts on circuit boards. As a result, different tip adapters 320 could be selected and used to heat those components without loosening adjacent components on the circuit boards. Moreover, the distance between the radiant plate 304 and a component can affect the amount of heating provided to the component, so different tip adapters 320 could be selected and used to vary the spacing between the radiant plate 304 and the component to be heated.

In this way, the use of the tip adapters 320 may allow the same reworking nozzle 110 to be used during reworking operations involving a variety of components. The reconfigurable nature of the reworking nozzle 110 therefore provides flexibility in use and reduced costs for users.

Although not shown, one or more vents are provided in the housing 302 to provide for the passage of heated gas out of the reworking nozzle 110. Any number of vents could be used with the housing 302, and each vent can have any suitable size and shape and be positioned at any suitable location. Each vent can direct gas in any suitable direction(s), and each vent could be adjustable to alter the direction of gas flow out of the reworking nozzle 110.

Figure 4A:
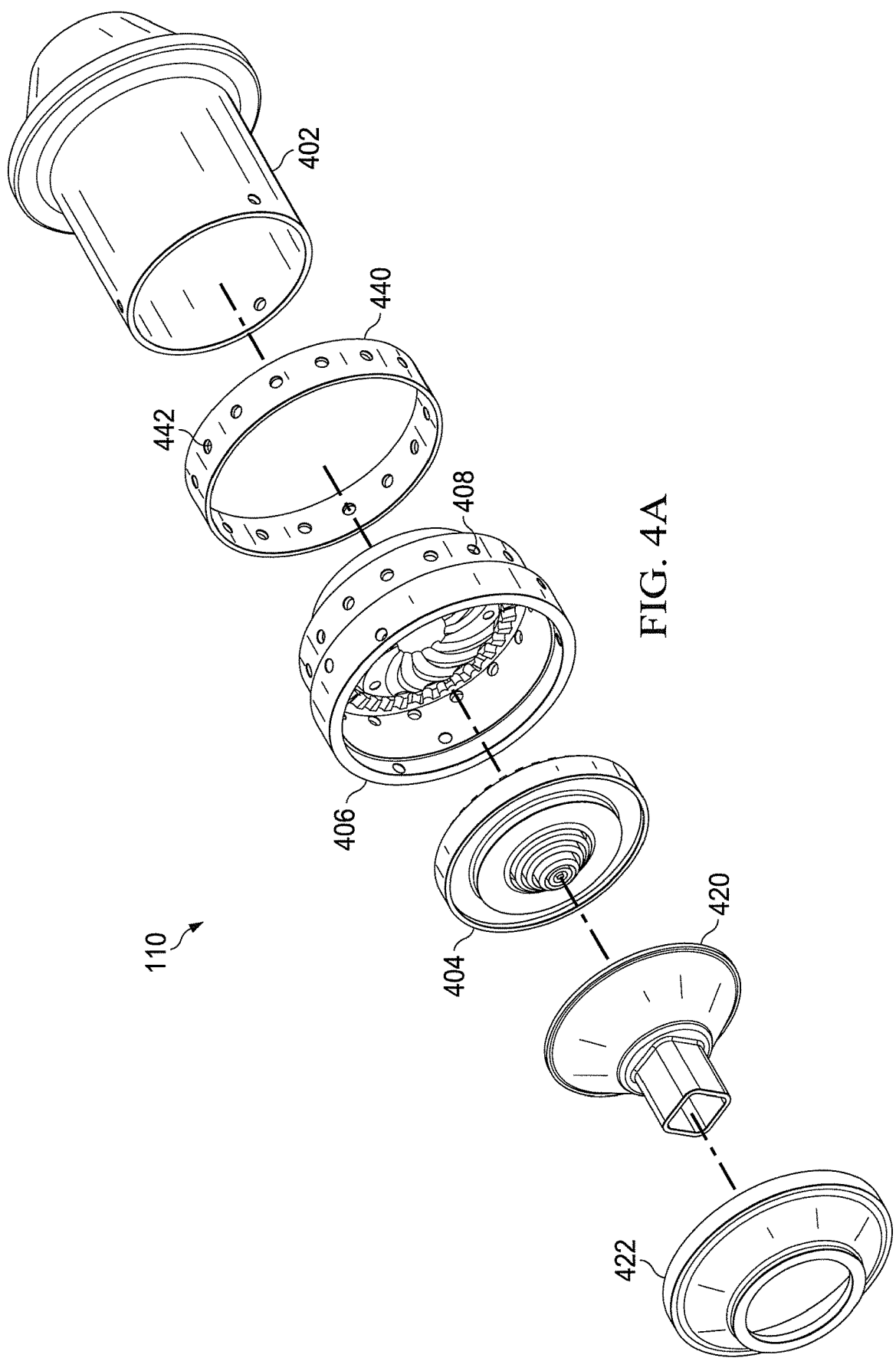
FIGS. 4A through 4D illustrate a third example oven-style reworking nozzle according to this disclosure.
Figure 4B:
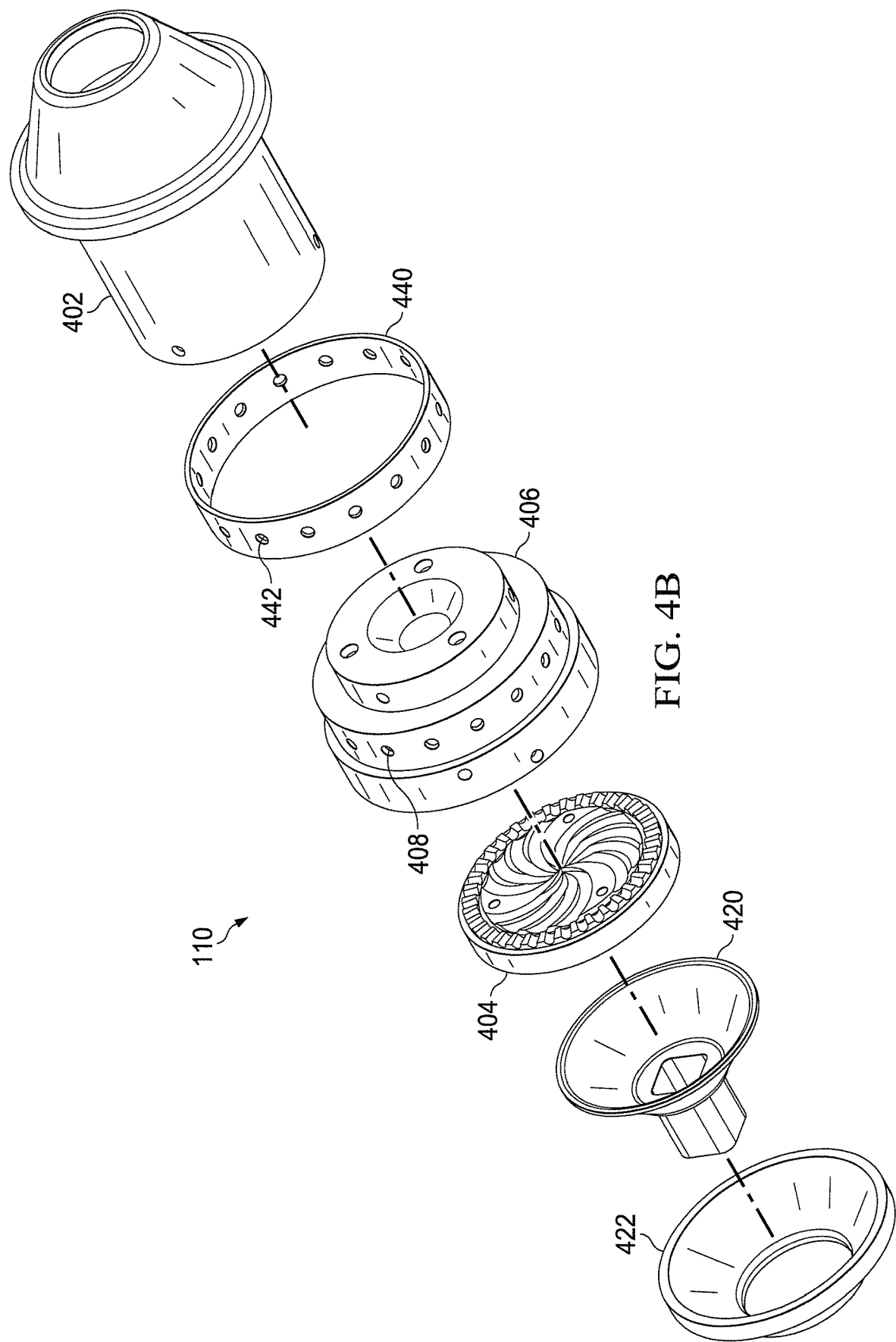

FIGS. 4A through 4D illustrate a third example oven-style reworking nozzle 110 according to this disclosure. As shown in FIGS. 4A and 4B, the reworking nozzle 110 here includes an upper housing 402, which forms the hot gas interface 116 of the reworking nozzle 110. The housing 402 attaches to a funnel plate 406, which defines a lower recess that is configured to receive a radiant plate 404. The funnel plate 406 directs a hot gas flow across the radiant plate 404 to transfer heat to the radiant plate 404.

Figure 4C:
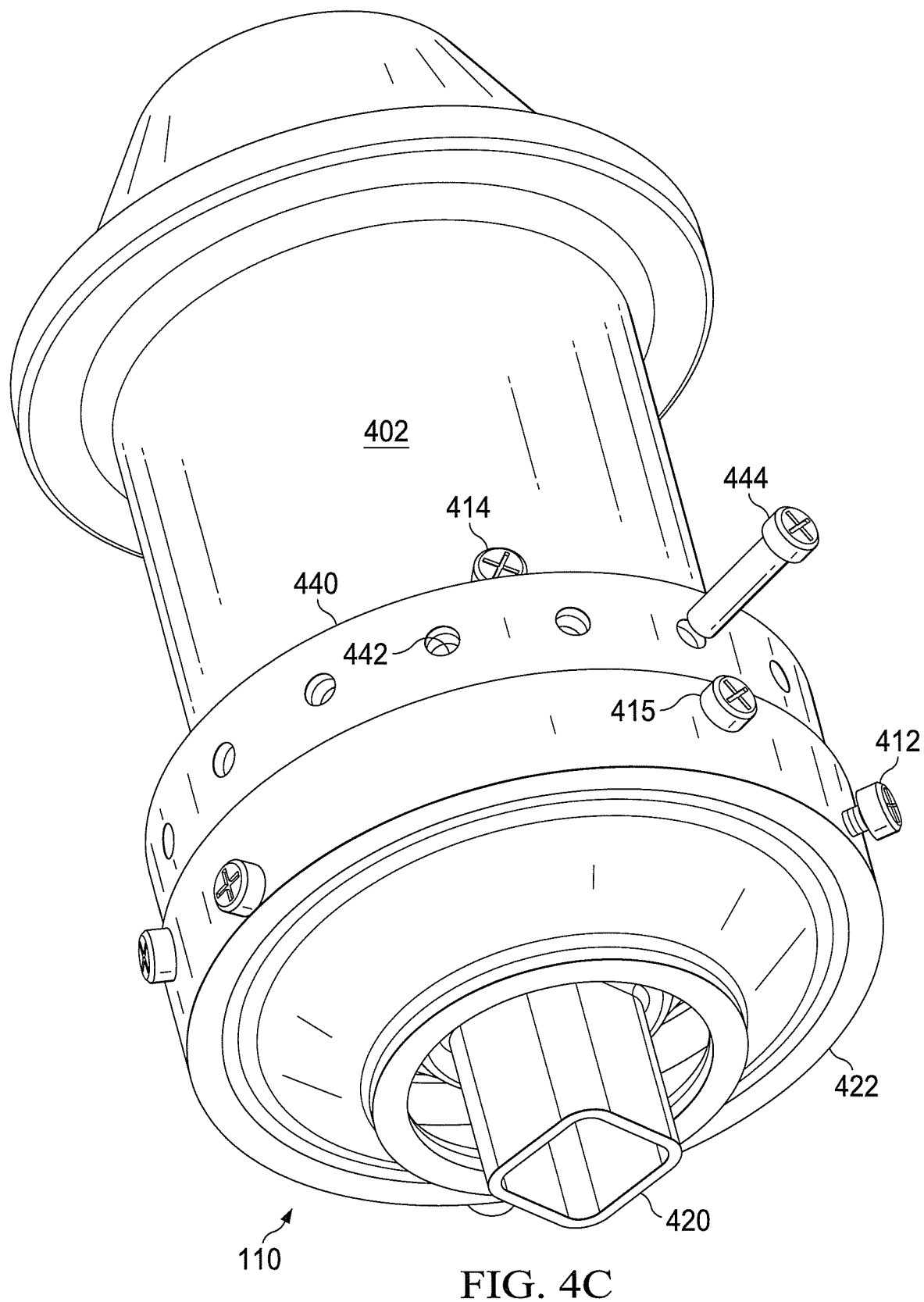
Figure 4D:
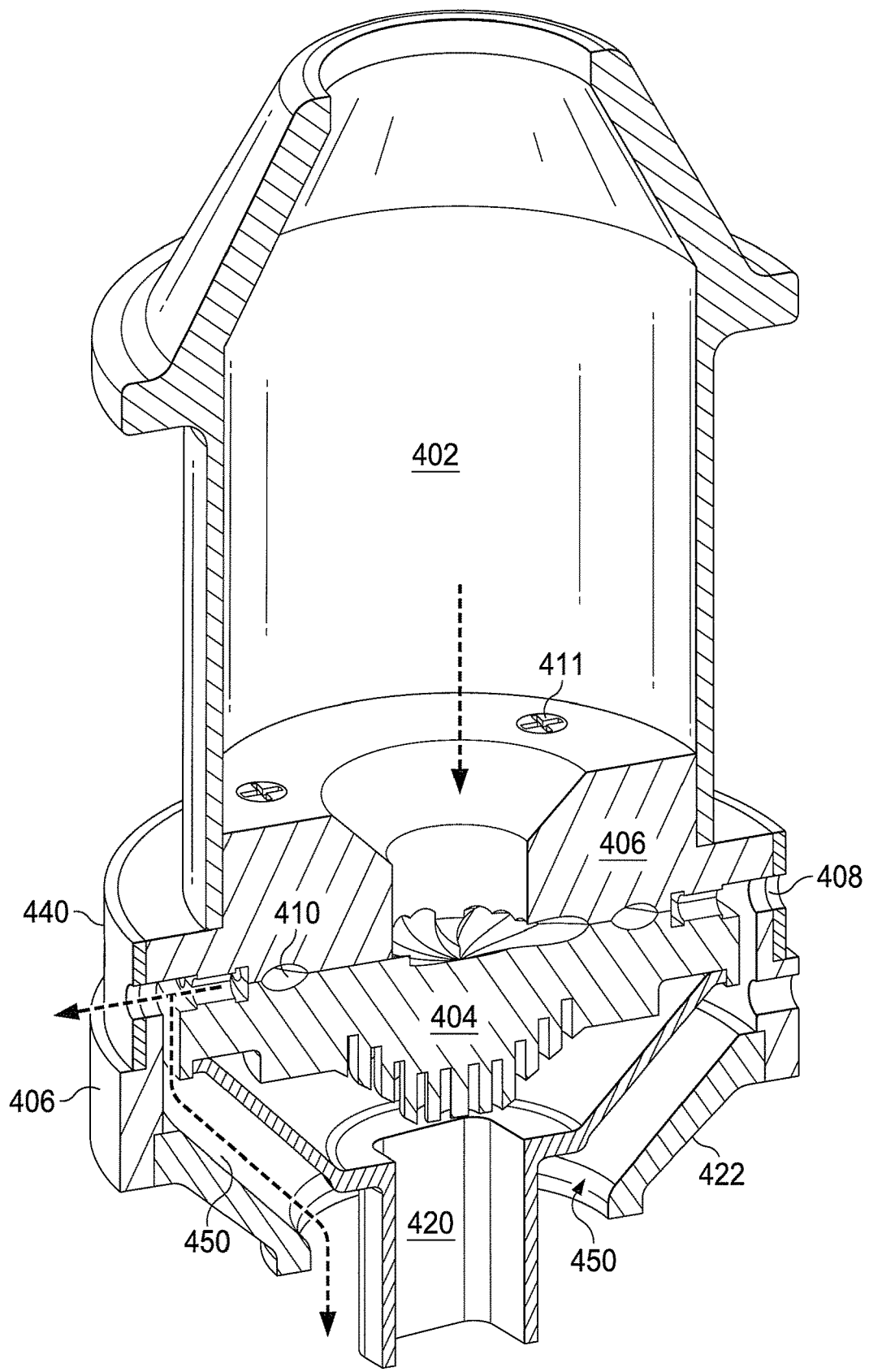

A tip adapter 420 can be coupled to the funnel plate 406. Different tip adapters 420 could be provided and attached to the reworking nozzle 110 at different times to support the use of the reworking nozzle 110 in various situations. As shown in FIGS. 4C and 4D, connectors 411 (such as screws or bolts) can be used to secure the radiant plate 404 and the funnel plate 406, and connectors 415 (such as screws or bolts) can be used to secure the tip adapter 420 to the reworking nozzle 110. Also, connectors 414 (such as screws or bolts) can be used to couple the housing 402 to the funnel plate 406. In addition, connectors 412 (such as screws or bolts) can be used to secure a directional exhaust ring 422 to the funnel plate 406.

The funnel plate 406 includes various vents 408, which in this example take the form of circular holes (although vents with other forms could be used). As shown in FIGS. 4A through 4C, a damper ring 440 is placed around the portion of the funnel plate 406 having the vents 408. The damper ring 440 includes openings 442 that substantially match the openings forming the vents 408. The damper ring 440 can be rotated to selectively block or unblock the vents 408. The vents 408 could be completely blocked, partially blocked, or completely unblocked by the damper ring 440. The damper ring 440 could be formed from any suitable material(s) and in any suitable manner. The damper ring 440 could also be controlled in any suitable manner. In this example, the damper ring 440 includes an adjustment knob 444, which can be turned in order to vary the amount of blockage of the vents 408. However, other mechanisms for controlling the rotation of the damper ring 440 could be used, including the use of friction to hold the damper ring 440 in its current position without external influence.

The damper ring 440 controls the direction of exhaust for gas exiting the reworking nozzle 110. As shown in FIG. 4D, one or more exhaust flow channels 450 exist between the tip adapter 420 and the directional exhaust ring 422. Gas received through the hot gas interface 116 formed by the housing 402 travels through flow channels 410 formed between the funnel plate 406 and the radiant plate 404. The gas exiting the flow channels 410 can be directed out through the vents 408 (away from the circuit board 102) and/or through the exhaust flow channels 450 (towards the circuit board 102). The damper ring 440 therefore provides a mechanism for controlling the amount of heated gas directed towards the circuit board 102, which controls the amount of heating provided to the circuit board 102.

Heating of the circuit board 102 using hot gas exhausted from the reworking nozzle 110 (instead of or in addition to the heating provided by the heat source 107) may be needed or desired to support reworking operations. For example, some circuit boards 102 may have the ability to absorb and distribute large amounts of heat, such as when a circuit board 102 represents a multi-level board containing a relatively large amount of copper or other metals. This could make it difficult to heat a component within the oven-style compartment 114 to an adequate level to reflow the solder 106. By directing heated gas towards the circuit board 102 outside the oven-style compartment 114, the heated gas can help to heat the circuit board 102 adequately to reflow the solder 106. Moreover, the gas flow towards the circuit board 102 is positioned outside the oven-style compartment 114, which helps to protect the component from turbulence caused by the hot gas flow.

Although FIGS. 2A through 4D illustrate various oven-style reworking nozzles 110, various changes may be made to FIGS. 2A through 4D. For example, any combination of features from these figures could be used in a single embodiment of the reworking nozzle 110. As a particular example, the reworking nozzle 110 in FIGS. 2A through 2D could include a tip adapter as shown in FIG. 3 or FIG. 4A through 4D. As another particular example, the reworking nozzles 110 in FIG. 3 and FIGS. 4A through 4D could include a larger oven-style compartment 114 as shown in FIG. 2, rather than a smaller tip adapter. As a third particular example, a damper ring 440 and one or more exhaust flow channels 450 could be used in either of the reworking nozzles 110 shown in FIGS. 2A through 2D and FIG. 3 to provide directional control of the gas flow exhaust. Any other or additional combination(s) of features from these figures could be used in a specific implementation of the reworking nozzle 110.

Figure 5:
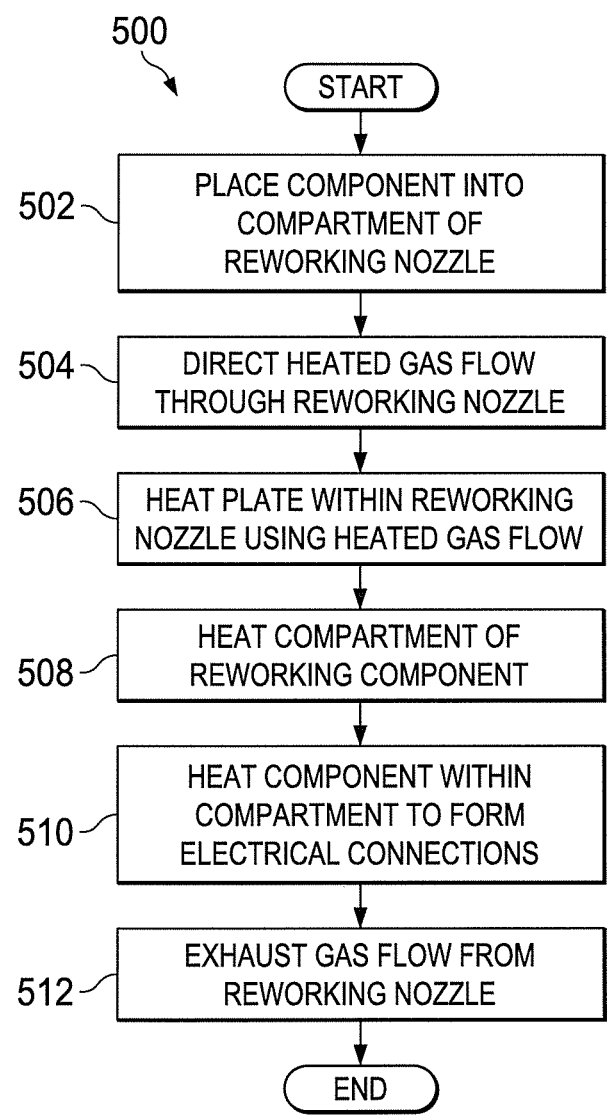
FIG. 5 illustrates an example method for performing reworking operations using an oven-style reworking nozzle according to this disclosure.

FIG. 5 illustrates an example method 500 for performing reworking operations using an oven-style reworking nozzle according to this disclosure. For ease of explanation, the method 500 is described with respect to the reworking nozzle 110 of FIGS. 4A through 4D. The same or similar method could be used with other reworking nozzles, although various steps could be omitted based on the design of the specific reworking nozzle being used.

As shown in FIG. 5, at least one component is placed into a compartment of a reworking nozzle at step 502. This could include, for example, maneuvering the reworking nozzle 110 so that a component 104 on a circuit board 102 is within an oven-style compartment 114 of the reworking nozzle 110.

Heated gas is directed through the reworking nozzle at step 504. This could include, for example, generating a gas flow using the hot gas source 108 and providing the gas flow to the hot gas interface 116 of the reworking nozzle 110. A radiant plate within the reworking nozzle is heated using the gas flow at step 506. This could include, for example, passing the heated gas flow through various flow channels 410 defined at least partially by the radiant plate 404 of the reworking nozzle 110. The heated gas transfers at least some of its heat to the radiant plate 404. The compartment of the reworking nozzle is heated using the heat from the radiant plate at step 508, which heats the component within the compartment at step 510. This could include, for example, radiant heat from the radiant plate 404 heating the oven-style compartment 114 and the component 104 within the oven-style compartment 114. This causes solder or other structures to melt and form electrical connections with the component 104.

The gas flow is exhausted from the reworking nozzle at step 512. This could include, for example, exhausting the gas flow through one or more vents 408 of the reworking nozzle 110, which could direct the gas away from the circuit board 102. This could also include exhausting the gas flow through one or more exhaust flow channels 450 towards the circuit board 102. Depending on the setting of the damper ring 440, all of the gas flow could be exhausted through the vents 408, all of the gas flow could be exhausted through the exhaust flow channels 450, or part of the gas flow could be exhausted through the vents 408 and part of the gas flow could be exhausted through the exhaust flow channels 450.

Although FIG. 5 illustrates one example of a method 500 for solder reworking using an oven-style reworking nozzle, various changes may be made to FIG. 5. For example, while shown as a series of steps, various steps in FIG. 5 could overlap, occur in parallel, occur in a different order, or occur any number of times. As a particular example, all of steps 504-512 could occur during the same time period.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a gas interface configured to be fluidly coupled to a gas source and to receive a heated gas flow from the gas source;
a convection-to-radiant heat transfer section configured to receive convection heat from the heated gas flow; and
a compartment configured to receive a component and solder attached to the component, the heat transfer section forming a part of the compartment;
wherein the heat transfer section is configured to convert the convection heat into radiant heat and to provide the radiant heat to the compartment in order to heat the component and the solder within the compartment; and
wherein the compartment is configured to substantially block the heated gas flow from contacting the component and the solder within the compartment.

2. The apparatus of claim 1, wherein the heat transfer section comprises a radiant plate configured to absorb the convection heat from the heated gas flow and to provide the radiant heat to the compartment.

3. The apparatus of claim 2, wherein the heat transfer section further comprises a funnel configured to direct the heated gas flow towards a central portion of the radiant plate.

4. The apparatus of claim 3, wherein:
the radiant plate partially defines one or more flow channels for the heated gas flow; and
the funnel partially defines the one or more flow channels for the heated gas flow.

5. The apparatus of claim 1, wherein a tip adapter at least partially defines the compartment, an end of the tip adapter having a smaller size than the heat transfer section.

6. The apparatus of claim 5, further comprising:
a directional exhaust ring, wherein one or more channels are defined between the directional exhaust ring and the tip adapter.

7. The apparatus of claim 6, further comprising:
one or more exhaust vent openings configured to allow exhaust of the heated gas flow from the apparatus; and
a damper configured to selectively release or block the one or more exhaust vent openings, the damper also configured to selectively force the heated gas flow into the one or more channels.

8. The apparatus of claim 7, wherein the one or more channels are configured to direct at least a portion of the heated gas flow towards a circuit board on which the component is being mounted.

9. A system comprising:
a gas source configured to generate a heated gas flow; and
a reworking nozzle comprising:
a gas interface configured to be fluidly coupled to the gas source and to receive the heated gas flow from the gas source;
a convection-to-radiant heat transfer section configured to receive convection heat from the heated gas flow; and
a compartment configured to receive a component and solder attached to the component, the heat transfer section forming a part of the compartment;
wherein the heat transfer section is configured to convert the convection heat into radiant heat and to provide the radiant heat to the compartment in order to heat the component and the solder within the compartment; and
wherein the compartment of the reworking nozzle is configured to substantially block the heated gas flow from contacting the component and the solder within the compartment.

10. The system of claim 9, wherein the heat transfer section comprises a radiant plate configured to absorb the convection heat from the heated gas flow and to provide the radiant heat to the compartment.

11. The system of claim 10, wherein the heat transfer section further comprises a funnel configured to direct the heated gas flow towards a central portion of the radiant plate.

12. The system of claim 11, wherein:
the radiant plate partially defines one or more flow channels for the heated gas flow; and
the funnel partially defines the one or more flow channels for the heated gas flow.

13. The system of claim 9, wherein a tip adapter at least partially defines the compartment, an end of the tip adapter having a smaller size than the heat transfer section.

14. The system of claim 13, wherein:
the reworking nozzle further comprises a directional exhaust ring; and
one or more channels are defined between the directional exhaust ring and the tip adapter.

15. The system of claim 14, wherein the reworking nozzle further comprises:
one or more exhaust vent openings configured to allow exhaust of the heated gas flow from the reworking nozzle; and
a damper configured to selectively release or block the one or more exhaust vent openings, the damper also configured to selectively force the heated gas flow into the one or more channels.

16. The system of claim 15, wherein the one or more channels are configured to direct at least a portion of the heated gas flow towards a circuit board on which the component is being mounted.

17. The system of claim 9, wherein the reworking nozzle is configured to selectively exhaust the heated gas flow from the reworking nozzle in at least one direction of multiple directions, a direction of the multiple directions being towards a circuit board carrying the component, in order to heat at least a portion of the circuit board.

18. A method comprising:
receiving a component and solder attached to the component in a compartment of a reworking nozzle;
receiving a heated gas flow at the reworking nozzle;
receiving convection heat from the heated gas flow at a convection-to-radiant heat transfer section of the reworking nozzle, the convection-to-radiant heat transfer section forming a part of the compartment;
providing radiant heat to the compartment of the reworking nozzle using the convection-to-radiant heat transfer section of the reworking nozzle in order to heat the component and the solder within the compartment; and
substantially blocking the heated gas flow from contacting the component and the solder within the compartment.

19. The method of claim 18, wherein the convection-to-radiant heat transfer section comprises:
a radiant plate that absorbs the convection heat from the heated gas flow and provides the radiant heat to the compartment, the radiant plate partially defining one or more flow channels for the heated gas flow; and
a funnel configured to direct the heated gas flow towards a central portion of the radiant plate, the funnel partially defining the one or more flow channels for the heated gas flow.

20. The method of claim 18, further comprising:
selectively exhausting the heated gas flow from the reworking nozzle in at least one direction of multiple directions, the multiple directions including a first direction through one or more exhaust vent openings of the reworking nozzle and a second direction through one or more channels towards a circuit board carrying the component.

* * * * *